United States Patent
Shan et al.

(10) Patent No.: US 9,380,511 B2
(45) Date of Patent: Jun. 28, 2016

(54) INFORMATION FEEDBACK METHOD FOR COORDINATED MULTIPOINT COMMUNICATION

(75) Inventors: Cheng Shan, Suwon-si (KR); Sung Tae Kim, Suwon-si (KR); Jin Kyu Han, Seoul (KR); In Ho Lee, Suwon-si (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 407 days.

(21) Appl. No.: 13/322,071

(22) PCT Filed: May 24, 2010

(86) PCT No.: PCT/KR2010/003254
§ 371 (c)(1),
(2), (4) Date: Dec. 13, 2011

(87) PCT Pub. No.: WO2010/134792
PCT Pub. Date: Nov. 25, 2010

(65) Prior Publication Data
US 2012/0076038 A1     Mar. 29, 2012

(30) Foreign Application Priority Data

May 22, 2009  (KR) .................. 10-2009-0045161

(51) Int. Cl.
*H04W 36/38*     (2009.01)
*H04B 7/02*      (2006.01)
(Continued)

(52) U.S. Cl.
CPC ............ *H04W 36/385* (2013.01); *H04B 7/024* (2013.01); *H04B 7/026* (2013.01); *H04L 5/0035* (2013.01);
(Continued)

(58) Field of Classification Search
None
See application file for complete search history.

(56) References Cited

U.S. PATENT DOCUMENTS 5,848,063 A * 12/1998 Weaver et al. ............... 370/331
5,926,470 A *  7/1999 Tiedemann, Jr. ............. 370/334
(Continued)

FOREIGN PATENT DOCUMENTS

KR    1020070073336    7/2007
KR    1020080072195    8/2008

OTHER PUBLICATIONS

PCT/ISA/237 Written Opinion issued on PCT/KR2010/003254 (pp. 3).

(Continued)

*Primary Examiner* — Chirag Shah
*Assistant Examiner* — Suk Jin Kang
(74) *Attorney, Agent, or Firm* — The Farrell Law Firm, P.C.

(57) ABSTRACT

Coordinated multipoint communication is a technology for improving cell-edge performance for users in a cell-type mobile communication system. In order to enable a coordinated multipoint transmission/reception operation, a user equipment report of a local environment is required to select both coordinated communication modes and communication partners in evolved Node B (eNB) base stations. According to the present invention, a method is described for feeding back information from User Equipment (UE) to a serving base station to enable a coordinated multi-point transmission/reception operation. The information reported through the feedback is classified into two categories corresponding to received signal intensity information and received signal timing information. The UE may select one or both types of information from between the categories to provide feedback. In embodiments of the present invention, various overhead-reducing reporting formats are described.

13 Claims, 5 Drawing Sheets

(51) Int. Cl.
*H04L 5/00* (2006.01)
*H04B 7/06* (2006.01)
*H04L 25/03* (2006.01)
*H04W 52/24* (2009.01)
*H04W 52/40* (2009.01)

(52) U.S. Cl.
CPC ............ *H04L 5/0091* (2013.01); *H04B 7/0639* (2013.01); *H04L 5/0053* (2013.01); *H04L 2025/03808* (2013.01); *H04W 52/245* (2013.01); *H04W 52/40* (2013.01)

(56) References Cited

U.S. PATENT DOCUMENTS

| | | | |
|---|---|---|---|
| 2005/0174982 A1* | 8/2005 | Uehara et al. | 370/345 |
| 2007/0098106 A1* | 5/2007 | Khojastepour et al. | 375/267 |
| 2008/0080634 A1* | 4/2008 | Kotecha et al. | 375/267 |
| 2008/0132262 A1 | 6/2008 | Jung et al. | |
| 2008/0267317 A1* | 10/2008 | Malladi | 375/299 |
| 2009/0109937 A1* | 4/2009 | Cave et al. | 370/336 |
| 2009/0111473 A1 | 4/2009 | Tao et al. | |
| 2009/0279419 A1* | 11/2009 | To et al. | 370/208 |
| 2009/0279519 A1* | 11/2009 | Brisebois et al. | 370/338 |
| 2009/0280819 A1* | 11/2009 | Brisebois et al. | 455/446 |
| 2010/0056215 A1* | 3/2010 | Gorokhov et al. | 455/561 |
| 2010/0091892 A1* | 4/2010 | Gorokhov | 375/260 |
| 2010/0091893 A1* | 4/2010 | Gorokhov | 375/260 |
| 2010/0113054 A1* | 5/2010 | Iwamura et al. | 455/452.1 |
| 2010/0120397 A1* | 5/2010 | Kazmi et al. | 455/410 |
| 2010/0172340 A1* | 7/2010 | Muharemovic et al. | 370/350 |
| 2010/0202311 A1* | 8/2010 | Lunttila et al. | 370/252 |
| 2010/0239036 A1* | 9/2010 | Koo et al. | 375/260 |
| 2010/0254335 A1* | 10/2010 | Koo et al. | 370/329 |
| 2010/0265904 A1* | 10/2010 | Yang et al. | 370/329 |
| 2010/0272032 A1* | 10/2010 | Sayana et al. | 370/329 |
| 2010/0272074 A1* | 10/2010 | Cheng et al. | 370/336 |
| 2010/0273514 A1* | 10/2010 | Koo et al. | 455/501 |
| 2010/0284345 A1* | 11/2010 | Rudrapatna et al. | 370/329 |
| 2010/0290382 A1* | 11/2010 | Hui et al. | 370/312 |
| 2010/0291940 A1* | 11/2010 | Koo et al. | 455/450 |
| 2010/0303039 A1* | 12/2010 | Zhang et al. | 370/331 |
| 2010/0309793 A1* | 12/2010 | Choi et al. | 370/252 |
| 2011/0098054 A1* | 4/2011 | Gorokhov et al. | 455/452.1 |
| 2011/0200029 A1* | 8/2011 | Farmandar et al. | 370/338 |
| 2011/0222501 A1* | 9/2011 | Kim et al. | 370/329 |
| 2011/0249665 A1* | 10/2011 | Seyama et al. | 370/350 |
| 2011/0268211 A1* | 11/2011 | Khojastepour | 375/267 |
| 2011/0268214 A1* | 11/2011 | Khojastepour | 375/267 |
| 2011/0269459 A1* | 11/2011 | Koo et al. | 455/434 |
| 2011/0281585 A1* | 11/2011 | Kwon et al. | 455/436 |
| 2011/0305223 A1* | 12/2011 | Koo et al. | 370/335 |
| 2011/0317652 A1* | 12/2011 | Kim et al. | 370/329 |
| 2011/0319092 A1* | 12/2011 | Kim et al. | 455/452.1 |
| 2012/0008563 A1* | 1/2012 | Johansson et al. | 370/328 |
| 2012/0021738 A1* | 1/2012 | Koo et al. | 455/422.1 |
| 2012/0027048 A1* | 2/2012 | Lindoff et al. | 375/140 |
| 2012/0028665 A1* | 2/2012 | Kwon et al. | 455/501 |
| 2012/0033540 A1* | 2/2012 | Kim et al. | 370/203 |
| 2012/0082058 A1* | 4/2012 | Gerstenberger et al. | 370/252 |
| 2012/0087310 A1* | 4/2012 | Hui et al. | 370/328 |
| 2012/0127911 A1* | 5/2012 | Nishikawa et al. | 370/312 |
| 2012/0184322 A1* | 7/2012 | Falconetti et al. | 455/524 |
| 2012/0188888 A1* | 7/2012 | Wang et al. | 370/252 |
| 2012/0189077 A1* | 7/2012 | Seo et al. | 375/267 |
| 2012/0282966 A1* | 11/2012 | Koo et al. | 455/517 |
| 2012/0327981 A1* | 12/2012 | Sayana et al. | 375/219 |

OTHER PUBLICATIONS

PCT/ISA/210 Search Report issued on PCT/KR2010/003254 (pp. 3).
CMCC, "Views on the Relationship Among CoMP Sets", R1-091830, 3GPP TSG RAN WG1 meeting #57, May 4-8, 2009.
Korean Office Action dated May 20, 2015 issued in counterpart application No. 10-2009-0045161.

* cited by examiner

INFORMATION FEEDBACK METHOD FOR COORDINATED MULTIPOINT COMMUNICATION

PRIORITY

This application claims priority to International Patent Appl. No. PCT/KR2010/003254 filed May 24, 2010, and to Korean Patent Application No. 10-2009-0045161 filed May 22, 2009, the disclosure of each of which is incorporated herein by reference.

BACKGROUND OF THE INVENTION

1. Field of the Invention

The present invention relates to a general mobile radio communication system and, in particular, to an OFDM radio communication system supporting backhaul communication of eNBs. The eNBs of radio communication system are capable of performing coordinated transmission through backhaul communication. This is referred to as Coordinated Multipoint processing (CoMP).

Throughout the present invention, 3GPP LTE Release 8 system is referred to as a legacy system, in-development Release 10 system is the system to which the embodiments of the present invention are applied. Of course, the present invention can be applied to other mobile communication systems such as IEEE 802.16 (WiMax) system.

2. Description of the Related Art

CoMP Transmission

Basically, CoMP processing operations can be categorized into following categories:

Joint processing (JP): In JP, eNBs perform scheduling jointly and may not open.

Transmission point(s) for CoMP transmission/reception operation: point or as set of points transmitting physical downlink shared channel (PDSCH) to UE dynamically (1) Transmission point(s) are a subset of the coordination set for CoMP transmission.

(2) In JP, the transmission points for CoMP transmission are the points of a coordination set for CoMP processing.

(3) In dynamic cell selection, transmission is available at point at a time, and the transmission point can be changed dynamically in every subframe.

(4) In coordinated scheduling/beamforming, the transmission point for CoMP transmission is "serving cell."

2. Reporting Set for CoMP Processing

Set of the cells in which channel status/statistic information related to the link to the UE (1) The reporting set can be identical with the cooperation set (2) The real UE report can select downlinks of the cell for transmitting real feedback information.

Essential Feedback Between UE and eNB for CoMP Transmission/Reception Operation

In order to support CoMP transmission/reception operation, it is necessary to receive UE feedback for multiple communication channels from multiple eNBs. In the legacy system, the multipoint transmission is possible only with multiple antennas of the same eNB, and thus the following information is necessary for extending the multipoint transmission to the case of multiple eNBs.

1. In order to support JP, entire/partial channel state information of each channel is required, and such information can include channel state information (CSI), plural channel quality indicators (CQIs) of each channel, and optimum precoding matrix indicator (PMI).

2. In order to support coordinated scheduling/beamforming, plural CQIs of sub-bands predetermined per channel or worst PMIs of neighbor cells that are influenced as interference are required.

The most of feedback formats for supporting CoMP transmission/reception operation cause significant overhead. It is an object of the present invention to reduce the overhead of feedback for CoMP transmission/reception operation.

Complex Delay Profile in CoMP Transmission

In OFDM-based system, Cyclic Prefix (CP) is added at the head of each OFDM symbol. The CP is added to each OFDM symbol to absorb Inter-Symbol Interference by the previous symbols caused by the paths delayed on the communication channel. Typically, multipath fading channel is expressed as delay profile of gain to the delay time of the delayed paths. The OFDM system is designed such that CP absorbs the most of the inter-symbol interference. Also, the OFDM system can adjust the length of CP in match with the channels having different maximum delays.

Meanwhile, in case of CoMP transmission in a single UE communicates with multiple eNBs, the communication channel corresponds to a complex channel composed of a plurality of multipath channels. For example, in case of downlink (DL) as shown in FIG. 3, the UE is synchronized with the serving eNB but the signal from the cooperated eNB1 arrives with extra delay $\Delta D1$ according to the extra electric wave delay. Such two channels are aggregated by the receiver of the UE and, as a consequence, the maximum delay becomes max(D0, $\Delta D1+D1$) and can be longer than the predetermined CP according to the geographical positions of the eNBs and corresponding channel states.

If the maximum delay of the complex channel is longer than the predetermined CP, the system performance is degraded by intra-symbol interference and thus it may not be preferably to apply CoMP transmission. Accordingly, when selecting a partner for CoMP transmission, it is important to determine whether the neighbor eNB is appropriate for the CoMP transmission for a specific UE.

However, there is no mechanism, specified in the present mobile communication system standards, for a UE to report the timing information of the signal received in the neighbor cell yet.

DISCLOSURE OF INVENTION

Technical Problem

It is the first object of the present invention to provide a method for a UE to transmit CoMP transmission set selection or recommendation information to a serving eNB with the overhead restricted to a few bits.

It is the second object of the present invention to provide a method for transmitting timing information of the signals received from multiple cells to the serving eNB with the overhead restricted to a few bits.

It is the third object of the present invention to provide a method for the UE to transmit joint CoMP transmission set selection or recommendation information including timing information of the signals received from other cells to the serving eNB with the overhead restricted to a few bits.

Solution to Problem

In order to achieve the first object, an eNB is necessary to notify the UE of a list of potential eNBs for CoMP processing with the current serving cell. This can be done according to one of periodic broadcast message or UE-specific message transmitted by the eNB. For example, if the UE reports strong RSSI of at least one neighbor cells, the eNB can transmit the eNB list to the UE.

In order to achieve the first object, the UE is necessary to receive the eNB list and perform predefined measurement for the signals received from the eNB included in the list. The UE is necessary to perform predefined common quantization and expresses the measurement result using quantization vectors of predefined vector table. The UE also transmits the vector index to the serving eNB with CoMP transmission set selection or recommendation. When the above described feedback is received from the UE, the serving eNB can select the same CoMP transmission set as indicated by the UE or a set of other eNBs for CoMP transmission based on local accumulative information.

In order to achieve the second object, the UE reports the signal received from neighbor cells, and feedback is further necessary. Typically, such feedback is transmitted according to the format of the RSSI message. In this embodiment, RSSI message further includes additional reception timing fields or is combined with parallel reception time difference (Received Timing Difference; RTD) if necessary.

In order to achieve the third object, the combination feedback formats of the above-described reports are defined. The combined feedback formats are designed to be presented in the same signal strength and signal delay report.

The general information exchange protocol of the preferred embodiments of the present invention is depicted in FIG. 3.

In accordance with an aspect of the present invention, a feedback method of a terminal for supporting coordinated multipoint processing in mobile communication system includes generating a measurement report message including measurement of link qualities of a serving base station and candidate base stations adjacent to the serving base station; transmitting the measurement report message to the serving base station; and receiving data transmitted by cooperative base stations selected among the serving base station and candidate base stations according to the measurement report message.

In accordance with another aspect of the present invention, a cooperation method of a base station for cooperative multipoint processing in a mobile communication system includes determining cooperative base stations by analyzing link qualities of candidate base stations that are included in a measurement report message transmitted by a terminal; and transmitting data to the terminal in cooperation with the cooperative base stations.

Advantageous Effects

Accordingly, the present invention is capable of transmitting CoMP transmission set selection or recommendation information from the UE to the serving eNB with limited overhead of a few bits.

Also, the present invention is capable of transmitting reception timing information of the signals received from other cells from the UE to the serving eNB with limited overhead of a few bits.

Furthermore, the present invention is capable of transmitting CoMP transmission set selection or recommendation information including reception timing information of the signals received from other cells from the UE to the serving eNB with limited overhead of a few bits.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
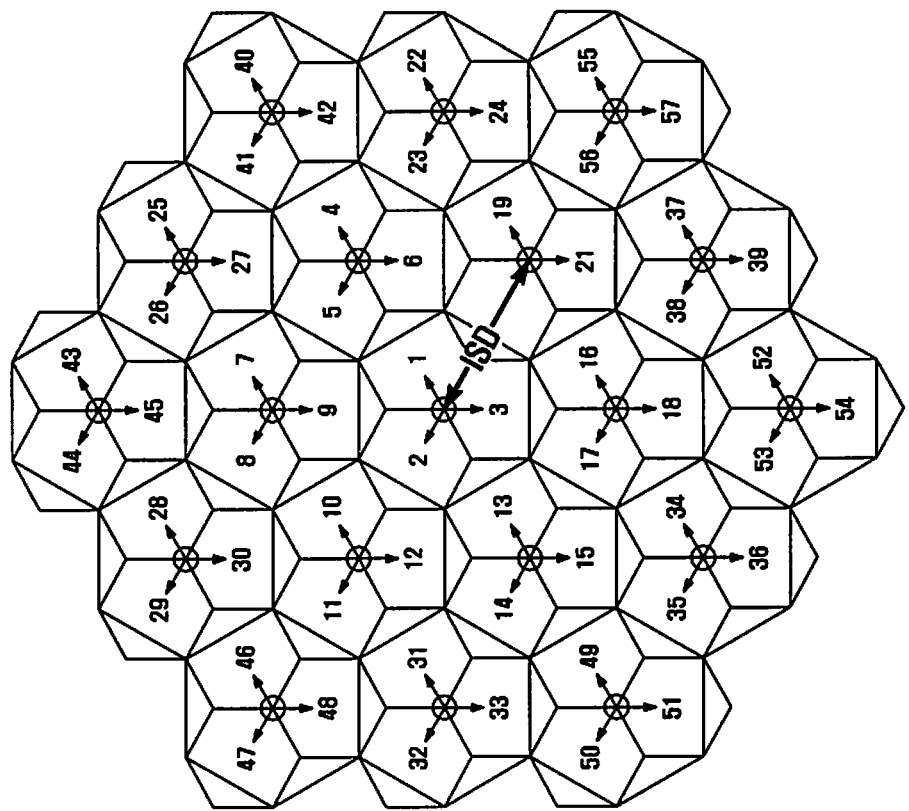
FIG. 1 is a diagram illustrating a cellular layout of a radio communication system.
Figure 1:
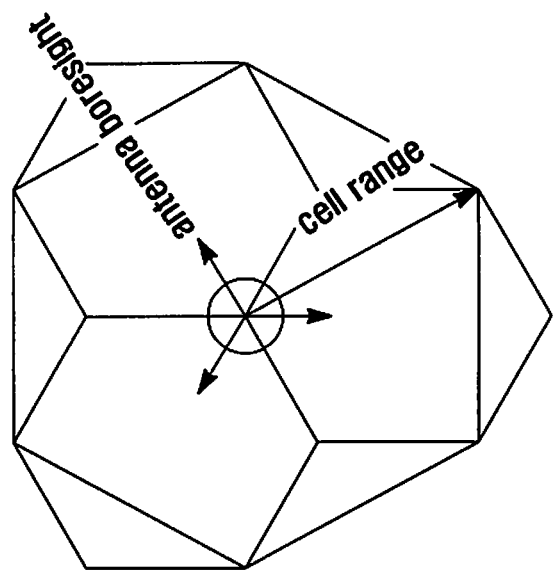
Figure 2:
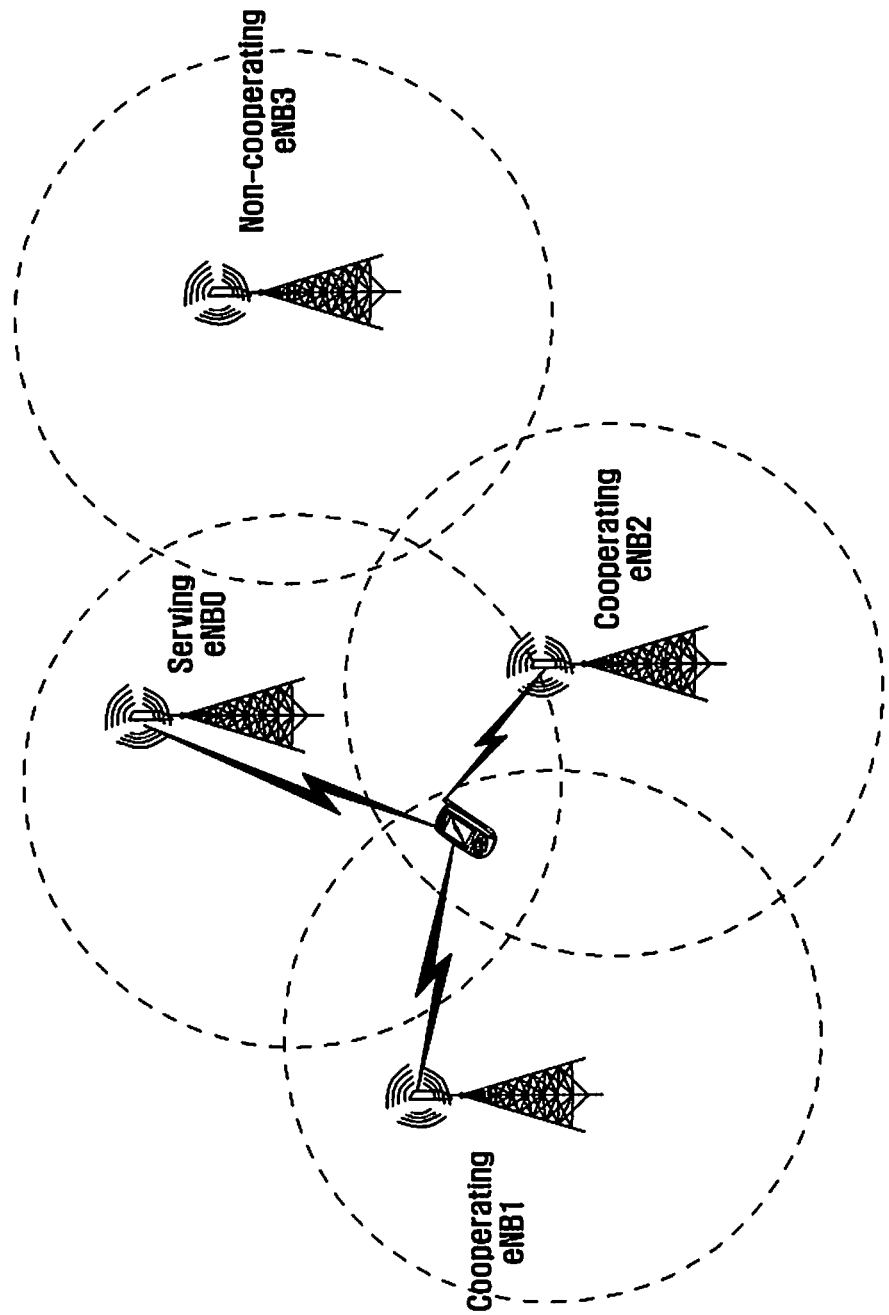
FIG. 2 is a diagram illustrating a CoMP transmission scenario according to an embodiment of the present invention.

FIG. 1 is a diagram illustrating a cellular layout of a radio communication system. FIG. 2 is a diagram illustrating a CoMP transmission scenario according to an embodiment of the present invention.

Referring to FIG. 1, the radio communication system is implemented in cellular topology. That is, the radio communication system is composed of a plurality of cells. Each cell is under of an evolved Node B (eNB). In the radio communication system, each cell can cooperate with some of neighbor cells according to an embodiment of the present invention. For example, in the radio communication system, the serving eNB0 of a certain UE cooperates with cooperative eNB1 and eNB2 among the adjacent cells for transmission to the UE as depicted in FIG. 2. At this time, although close to the serving eNB0, non-cooperative eNB3 does not cooperate with the serving eNB0.

Figure 3:
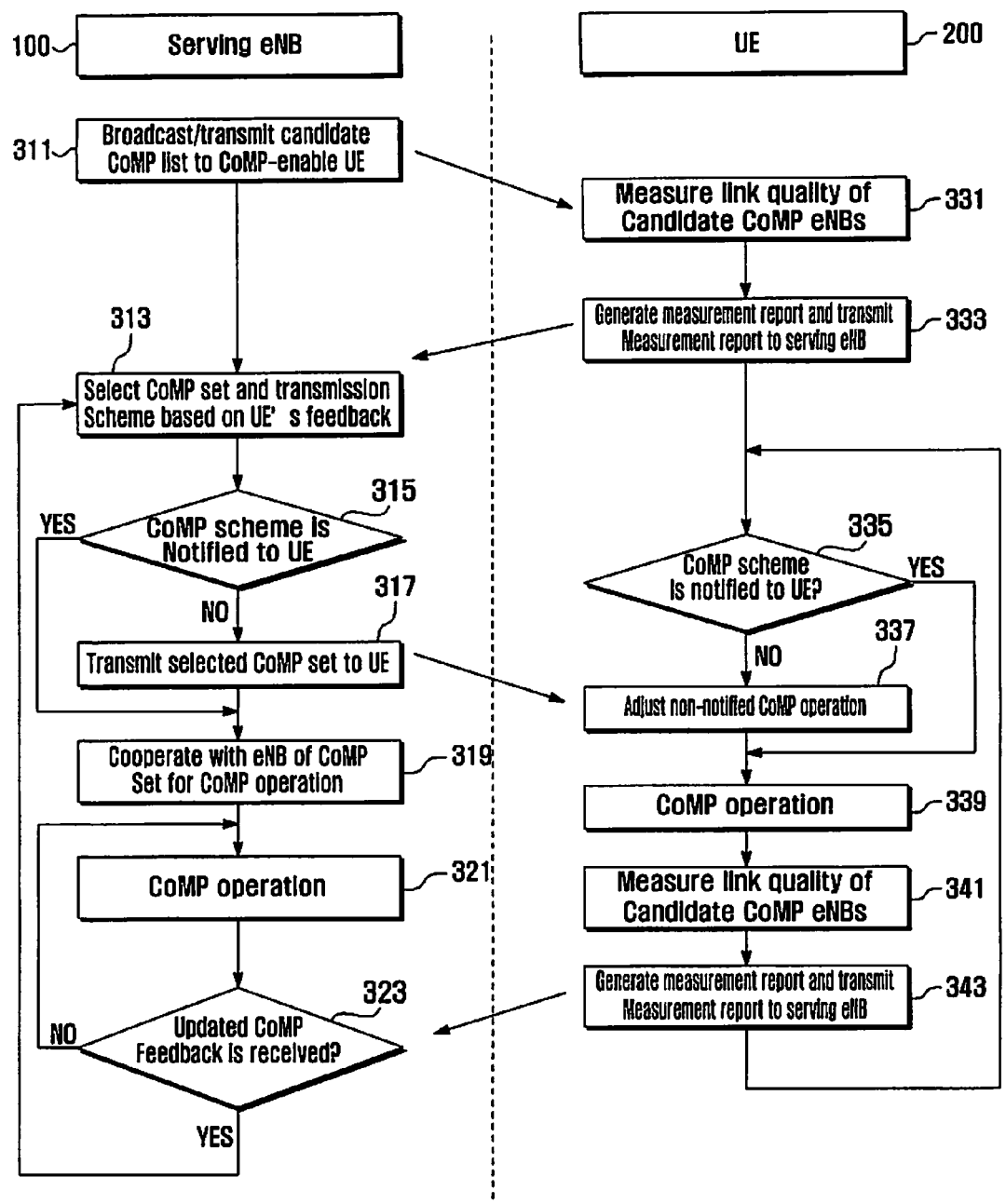
FIG. 3 is a diagram illustrating CoMP processing information exchange protocol between eNB and UE according to an embodiment of the present invention.

FIG. 3 is a diagram illustrating CoMP processing information exchange protocol between eNB and UE according to an embodiment of the present invention. Although the description is directed to the case where the base station is eNB in this embodiment, however, the present invention is not limited thereto.

Referring to FIG. 3, the serving eNB 100 broadcasts/transmits a CoMP transmission/reception eNB candidate list to the CoMP transmission/reception-enabled UE 200 at step 311. Afterward, if the UE 200 feeds back a measurement report, the serving eNB 100 analyzes the measurement report to select the CoMP transmission set and transmission scheme at step 313. The measurement report includes the channel state and delay of the received signal. Next, the serving eNB 100 determines whether the CoMP processing scheme is notified to the eNB 200 at step 315. If it is determined that the CoMP processing scheme is not notified to the eNB 200 at step 315, the serving eNB 100 selects a CoMP transmission set and transmits the CoMP transmission set to the UE 200 at step 317. Otherwise, if it is determined that the CoMP processing scheme is notified to the eNB 200 at step 315 or after the transmission of the CoMP transmission at step 317, the serving eNB 100 cooperates with the eNB indicated in the CoMP transmission set for CoMP transmission at step 319. Next, the serving eNB 100 performs CoMP operation at step 321. At this time, if a feedback for updated CoMP transmission is detected at step 323, the serving eNB 100 repeats at least some of steps 313 to 323 and, otherwise, returns the procedure to step 321.

If the CoMP transmission eNB candidate list is received from the serving eNB 100, the UE 200 measures link qualities of the candidate CoMP eNBs at step 331. Next, the UE 200 generates measurement report and transmits the measurement report to the serving eNB 100 at step 333. The UE 200 determines whether the CoMP transmission scheme is notified at step 335. If it is determined that the CoMP transmission scheme is not notified at step 335, the UE 200 adjusts non-notified CoMP reception operation at step 337. If it is determined that the CoMP transmission scheme is notified at step 335 or after the adjustment of non-notified CoMP reception operation at step 337, the UE 200 perform CoMP reception operation at step 339. Afterward, the UE 200 measures link qualities of CoMP transmission candidate eNBs at step 341. Next, the eNB 200 generates measurement report and transmits the measurement report to the serving eNB, i.e. performs feedback, at step 343.

The CoMP transmission/reception technique of the present invention is described hereinafter in more detail.

The present invention is focused on the scenario in which multiple adjacent cells perform cooperative transmission to a certain UE, i.e. cooperate the use of frequency or space resource to perform transmission selectively.

The present invention are characterized by the following features.
1. Definition and notification of CoMP transmission set
2. Feedback format of CoMP transmission set selection from UE to serving eNB based on received signal strength
3. Timing delay feedback format of neighbor eNB reception signal to serving eNB reception signal reported from UE to serving eNB based on received signal timing information
4. Feedback format of CoMP transmission candidate set from UE to serving eNB in consideration of received signal strength and received signal timing information CoMP Transmission Candidate Set Definition and Notification 1. Definition of CoMP Transmission Candidate Set In the present invention, the CoMP transmission candidate set is defined as the set of eNBs available for CoMP transmission with the current eNB, and other eNBs are not taken into account even though they are reported with strong signal strength in a given time.

Each eNB manages a candidate list based on the position and notifies the UE of the candidate list before CoMP transmission/reception.

In the present invention, the CoMP transmission candidate set includes M elements and represented by $S_{Candidate}$, and each element indicates a candidate eNB.

2. Management of CoMP Candidate Set
   a) Fixed
   For example, each eNB predefines a set of neighbor eNBs that can join the CoMP transmission as the CoMP transmission candidate set as shown in FIG. 1, and cell 1 can select only the cells 9, 5, 6, and 20 for CoMP transmission. The CoMP transmission set including these four cells is fixed after the deployment of the cells.

b) Adaptive
   The CoMP transmission set of each eNB can vary as time goes. Since this update is static in general, the CoMP transmission candidate set of each eNB is not changed for a long time. The eNB can determine the candidate set based on season-based shadowing effect, change of ambient environment, and RSSI report-based observation from multiple UEs for long time.

3. Notification of CoMP Transmission Set to UE
   Basically, there are two ways for transmitting CoMP transmission candidate set (CANDIDATE_COMP_SET) to UEs supporting CoMP transmission/reception as shown in FIG. 2.
   a) broadcast
   Each eNB can broadcast CANDIDATE_COMP_SET periodically.
   It is preferred to broadcast sporadically to reduce overhead.
   Particularly in 3GPP LTE system, the broadcast can be performed on one of the broadcast channels such as physical downlink control channel (PDCCH) or multimedia broadcast multicast service over a single frequent network (MBSFN) frames.
   b) UE-specific message transmission in response to one of following predetermined events
   If a UE approaches the serving eNB, i.e. performs handover from another cell, the serving eNB transmits CANDIDATE_COMP_SET. After capability negotiation, the eNB transmits the CANDIDATE_COMP_SET to the UEs depending on the CoMP processing capability. or
   if the UE reports relatively high RSSI of a neighbor cell in the CoMP transmission candidate set to the eNB, the serving eNB transmits CANDIDATE_COMP_SET. If storing RSSI is detected in at least one neighbor cell, the eNB should transmit CANDIDATE_COMP_SET to the UE for initial measurement for CoMP transmission.

4. CANDIDATE_COMP_SET Message Format
   a) CANDIDATE_COMP_SET includes a list of eNB IDs, tables 1 and 2 show exemplary CANDIDATE_COMP_SET message format.

TABLE 1

Exemplary CANDIDATE_COMP_SET message format for IEEE 802 system

| Syntax | Length | Notes |
| --- | --- | --- |
| CANDIDATE_COMP_SET (){ | | |
| Message ID | 8 bits | Indicate message type |
| Number of candidate eNBS, N | 2 bits | Number of eNBs in list; four candidate eNBs can be discriminated by 3-bit field |
| For i=1 toN { | | |
| eNB ID | 16 bits | |
| } | | |
| Reserved | 6 bits | |
| } | | |

TABLE 2

Exemplary CANDIDATE_COMP_SET MESSAGE specified in feedback format of 3GPP

| 9 bit Cell ID for candidate CoMP eNB1 | 9 bit Cell ID for candidate CoMP eNB2 | 9 bit Cell ID for candidate CoMP eNB3 | 9 bit Cell ID for candidate CoMP eNB4 | Other fields |
| --- | --- | --- | --- | --- |

The length of each field can be changed depending on the system implementation

By adding the aforementioned fields, it is possible to unify the above messages into a new message.

RSSI/CQI/CSI Measurement-Based CoMP Transmission Set Selection/Recommendation

Upon receipt of CANDIDATE_COMP_SET information, the UE has to measure the received signal strengths from the eNBs included in the list.

The measurement can be done based on synchronization channels or the reference signals of the eNBs included in the list. The target sequence pattern of the reference channels or synchronization channels of the eNBs included in the list can be acquired from eNB IDs.

Typically, UE reports the cell found in search process and RSSI of the corresponding cell to the serving eNB for handover purpose.

In the present invention, the neighbor eNB search process is scheduled by eNB and triggered by the UE in the following cases.

1. In case that CANDIDATE_COMP_SET is broadcast by the serving eNB periodically or sent to the UE right after initialization, if strong interference from at least one eNB included in the list of CANDIDATE_COMP_SET is detected 2. In case that CANDIDATE_COMP_SET is an attach-based message scheduled by the eNB, if CANDIDATE_COMP_SET is received The measurement result can be included in received signal strength/quality or detailed CSI format of communication channel Once the measurement has completed, the UE generates a report to be transmitted to the serving eNB. Such a report message can be transmitted in following formats.

Case 1: Entire List RSSI/CQI/CSI (Conventional Approach)

Once the measurement has completed, the UE can feedback RSSI/CQI/CSI of each link to the serving eNB, and the UE can use the conventional RSSI/CQI/CSI report message to transmit the measurement result.

In this case, the serving eNB can acquire detained information on the each CoMP transmission candidate link through an implemented algorithm, recommend the eNBs not included in the CoMP transmission candidate set to join the CoMP transmission, and determine the CoMP transmission scheme.

Case 2: Binary Selection/Recommendation of Cooperative Points for CoMP Processing In case 1, entire information of RSSI/CQI/CSI is fed back to the eNB, and logically the eNB can perform the CoMP processing determination more optimally as the more candidate link information is acquired. Meanwhile, if RSSI/CQI/CSI of all the links are transmitted to the eNB, this causes significant overhead in uplink (UL). There is no efficient method comparable to the execution gain accomplished according to "logically more better" CoMP processing determination.

In the present invention, it is assumed that the CoMP transmission candidate eNB list $S_{Candidate}$ becomes available in the UE before the CoMP processing operation. The UE can measure the signal strength of the reference signals transmitted by the eNBs included in the list.

In a preferred embodiment, the UE performs a local algorithm for selecting a preferred CoMP set. This algorithm operates based on at least the received signal strength measurement result. For example, the algorithm can be expressed by equation (1).

$$S_{UE\_Selected} = \{eNB | eNB \in S_{Candidate}, RSSI_{eNB} > RSSI_{Serving\_eNB} + T_{RSSI}\} \quad (1)$$

Here, the UE selects the eNBs of which RSSI fulfills a predetermined threshold value in $S_{Candidate}$. For example, if $T^{RSSI} = -6$ dB, the UE selects the eNBs of which RSSIs are less than 6 dB among the eNBs of which RSSIs are not worse than the sering eNB.

There can be other criteria in real implementation.

After generating $S_{UE\_Selected}$, the UE generates CoMP transmission set selection vector as shown in equation (2).

$$v(m) = \begin{cases} 1, & eNB(m) \in S_{UE\_Selected} \\ 0, & eNB(m) \notin S_{UE\_Selected} \end{cases}, m = 1 \ldots M \quad (2)$$

Next, the UE can transmit the selected vector to the eNB as recommendation of the CoMP transmission set election based on the local measurement. For example, the feedback message, i.e. UE_SELECTED_COMP_SET message, can be formatted as shown in table 3.

TABLE 3

Exemplary UE_SELECTED_COMP_SET message format for IEEE 802 system

| Syntax | Length | Notes |
| --- | --- | --- |
| UE_SELECTED_COMP_SET ( ) { | | |
| Message ID | 8 bits | Indicate message type |
| UE CoMP set selection indication | M (or M + 1) bits | $m^{th}$ bit indicates whether $m^{th}$ eNB in the CoMP processing list is preferable for CoMP processing operation. 1: mth eNB is preferable 0: mth eNB is not preferably (If cell selection is possible, another bit is added to indicate whether the serving eNB is needed to join the CoMP processing, and the total length is M + 1 bits) |
| Reserved | variable | |
| } | | |

TABLE 4

Exemplary UE_SELECTED_COMP_SET MESSAGE specified in feedback formation of 3GPP system

| | |
| --- | --- |
| 4 bit candidate CoMP eNB selection for listed candidate eNBs | Other fields |

In another embodiment of the present invention, restricted combination of candidate eNBs is preferable for CoMP transmission/reception operation. The predetermined CoMP combination table is stored in the eNB and UE in prior. The UE just reports the combination index selected in the combination table. In this way, it is possible to reduce overhead in case that M has a large value.

For example, the combination table can be defined as shown in table 5

TABLE 5

Exemplary CoMP transmission candidate eNB combination table

| Index | 1 | 2 | 3 | 4 | 5 | 6 | 7 | 8 |
|---|---|---|---|---|---|---|---|---|
| M = 1 | (0) | (1) | | | | | | |
| M = 2 | $\begin{pmatrix}0\\0\end{pmatrix}$ | $\begin{pmatrix}0\\1\end{pmatrix}$ | $\begin{pmatrix}1\\0\end{pmatrix}$ | $\begin{pmatrix}1\\1\end{pmatrix}$ | | | | |
| M = 3 | $\begin{pmatrix}0\\0\\0\end{pmatrix}$ | $\begin{pmatrix}1\\0\\0\end{pmatrix}$ | $\begin{pmatrix}0\\1\\0\end{pmatrix}$ | $\begin{pmatrix}0\\0\\1\end{pmatrix}$ | $\begin{pmatrix}1\\1\\0\end{pmatrix}$ | $\begin{pmatrix}0\\1\\1\end{pmatrix}$ | | |
| M = 4 | $\begin{pmatrix}0\\0\\0\\0\end{pmatrix}$ | $\begin{pmatrix}1\\0\\0\\0\end{pmatrix}$ | $\begin{pmatrix}0\\1\\0\\0\end{pmatrix}$ | $\begin{pmatrix}0\\0\\1\\0\end{pmatrix}$ | $\begin{pmatrix}0\\0\\0\\1\end{pmatrix}$ | $\begin{pmatrix}1\\1\\0\\0\end{pmatrix}$ | $\begin{pmatrix}0\\1\\1\\0\end{pmatrix}$ | $\begin{pmatrix}0\\0\\1\\1\end{pmatrix}$ |

In the above-described system, it is assumed that the serving eNB always joins the CoMP processing operation which supports the transmission points equal to less than three. If M=4, one bit can be reduced.

If UE_SELECTED_COMP_SET message is received from the UE, the serving eNB starts the CoMP processing operation recommended by the UE immediately or selects another CoMP processing set different from the UE-recommendation based on other local criteria. Since the final CoMP transmission set determination process is out of the range of the present invention, detailed description thereon is omitted herein.

Case 3: Quantized RSSI/CQI/CSI Report

In case 2, binary report format is defined for each candidate eNB. In another preferred embodiment, the binary report can be extended to the quantized RSSI/CQI/CSI report.

For example, after measurement, the UE generates CoMP processing set selection vector as equation (3). An exemplary feedback message, i.e. QUANTIZED_RELATIVE_RSSI message, is formatted as shown in tables 6 and 7.

$$v(i) = \begin{cases} 0, & RSSI_{eNB(i)} - RSSI_{Serving\_eNB} < -6 \text{ dB} \\ 1, & -6 \text{ dB} \le RSSI_{eNB(i)} - RSSI_{Serving\_eNB} < 0 \text{ dB} \\ 2, & 0 \text{ dB} \le RSSI_{eNB(i)} - RSSI_{Serving\_eNB} < 6 \text{ dB} \\ 3, & RSSI_{eNB(i)} - RSSI_{Serving\_eNB} \ge 6 \text{ dB} \end{cases} \quad (3)$$

$i = 1 \ldots M.$

TABLE 6

QUANTIZED_RELATIVE_RSSI message format for IEEE 802 system

| Syntax | Length | Notes |
|---|---|---|
| QUANTIZED_RELATIVE_RSSI ( ) { | | |
| Message ID | 8 bits | Indicate message type |
| QUANTIZED_RSSI | 2M bits | As aforementioned, the quantized RSSI is indicated by every two bits. |
| Reserved | variable | |
| } | | |

TABLE 7

QUANTIZED_RELATIVE_RSSI message format specified in feedback format of 3GPP system

| 2 bit | 2 bit | 2 bit | 2 bit | Other fields |
|---|---|---|---|---|
| RSSI for candidate CoMP eNB1 | RSSI for candidate CoMP eNB2 | RSSI for candidate CoMP eNB3 | RSSI for candidate CoMP eNB4 | |

After receiving quantized RSSI information, the eNB determines final CoMP transmission set and CoMP transmission scheme and starts CoMP transmission process. The detailed description on the features out of the scope of the present invention is omitted herein.

Case 4: Quantized Power Allocation Recommendation in CoMP Transmission Candidate Set In another preferred embodiment of quantized power allocation recommendation in CoMP transmission candidate set, after measuring RSSI/CQI/CSI from candidate eNBs, the UE performs local power allocation algorithm to calculate a power allocation set recommended for all candidate eNBs. If a channel model is estimated, this algorithm can be the waterfilling algorithm, i.e. a partial allocation algorithm based on received signal strength. Since the power allocation algorithm is out of the scope of the present invention, detailed description thereon is omitted herein.

The UE quantizes the power allocation in a predetermined power level set and transmits the quantized power allocation to the serving eNB.

The transmission power quantization and corresponding feedback message format, i.e. QUANTIZED_CoMP_PA message format, is formatted as shown in equation (4) and tables 8 and 9.

$$p(i) = \begin{cases} 0, & \text{no tranmission} \\ 1, & -3 \text{ dB Boosting} \\ 2, & 0 \text{ dB Boosting} \\ 3, & 3 \text{ dB Boosting} \end{cases}, i = 1 \ldots M \quad (4)$$

TABLE 8

Exemplary QUANTIZED_CoMP_PA
message format for IEEE 802 system

| Syntax | Length | Notes |
|---|---|---|
| QUANTIZED_CoMP_PA ( ) { | | |
| Message ID | 8 bits | Indicate message type |
| QUANTIZED_RSSI | 2M bits | As aforementioned, the quantized power allocation is indicated by every two bits. |
| Reserved | variable | |
| } | | |

TABLE 9

Exemplary QUANTIZED_CoMP_PA specified
in feedback formation of 3GPP system

| 2 bit PA for candidate CoMP eNB1 | 2 bit PA for candidate CoMP eNB2 | 2 bit PA for candidate CoMP eNB3 | 2 bit PA for candidate CoMP eNB4 | Other fields |
|---|---|---|---|---|

Relative boosting value is based on the transmission power of the serving eNB.

Case 5: Codebook-Based Beamforming Implementation

In case that multiple antennas can be used at the candidate eNBs, it is preferred to perform cooperative transmission to the UE as individual beamformings. In addition, transmission weight vector is required for each eNB. The weight vector is selected from a predetermined codebook, and the UE transmits a code index, e.g. precoding matrix indicator, to the serving eNB.

The above-described cases 2 to 4 can be combined easily according to codebook-based approach. That is, addition code indices are transmitted along with the messages defined in cases 2 to 4 to the serving eNB for CoMP processing scheduling.

In real implementation, it is necessary to report additional phase difference along with PMIs corresponding to the eNBs to present propagation difference from individual eNBs.

Signal Arrival Time Measurement-Based CoMP Processing Set Selection/Recommendation As described above, the signal arrival time difference between different eNBs can be an determinate factor of CoMP transmission/reception technique performance. The additional channel response of delay should bed limited within the CP length. Accordingly, it is important for the UE to report the information on the additional delays caused by candidate eNBs.

The UE detects the signals from candidate eNBs by referencing the reference signals. By acquiring synchronization in time and frequency domains, the UE can estimate maximum delay of the propagation channel of the reference signals. The UE can acquire the arrival time difference of the signals from different eNBs through time domain synchronization and the delay spread profile of the propagation channels of different eNBs through frequency domain synchronization and channel estimation. Since the maximum delay acquisition algorithm is out of the scope of the present invention, detailed description thereon is omitted herein.

Figure 4:
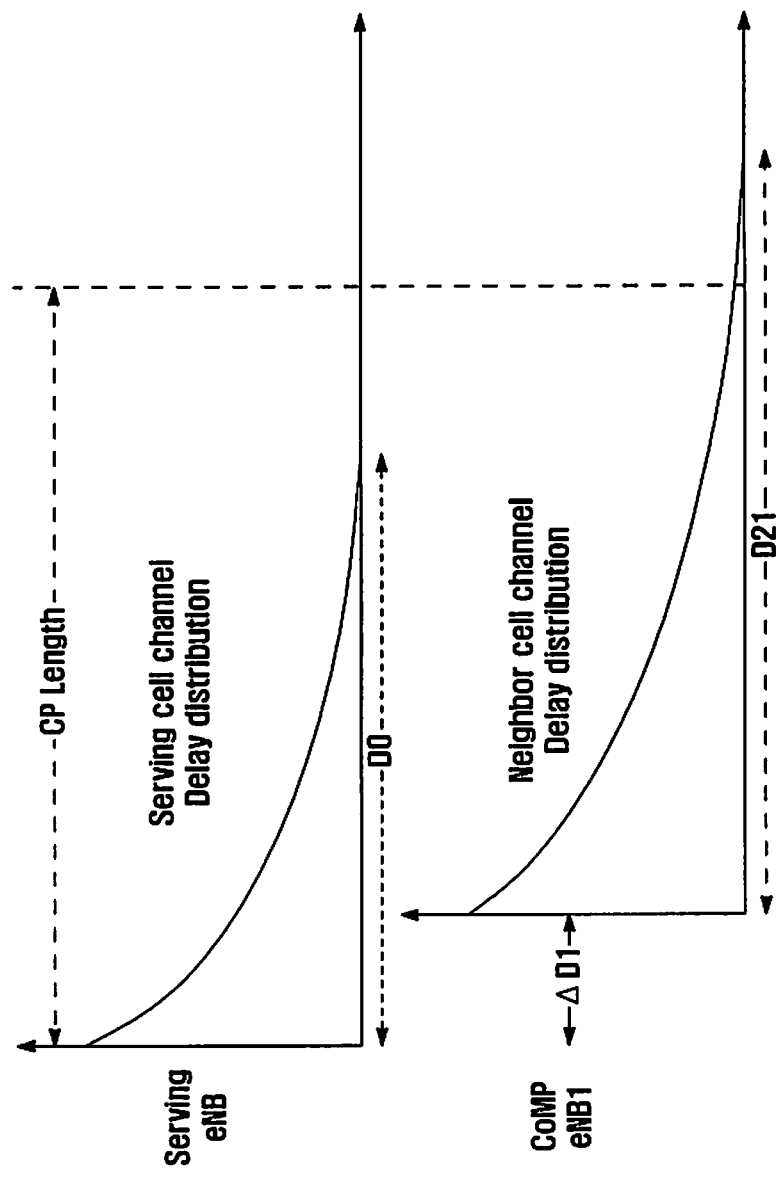
FIG. 4 is a diagram illustrating channel delays by additional cooperative eNBs.

FIG. 4 is a diagram illustrating channel delays by additional cooperative eNBs. As shown in FIG. 4, assuming that the UE is synchronized with the serving eNB, the additional delay $\Box D_1$ takes place when the cooperative eNB1 located far from the UE as much as $\Box L_1$ compared to the serving eNB. Here, $\Box D_1 = \Box L_{1/c}$, and c denotes the speed of light. $\Box D_0$ denotes synchronization offset, $D_0$ denotes maximum delay of the propagation channel of the serving eNB (assuming complete synchronization with the serving eNB, $\Box D_0 = 0$), $\Box D_1$ denotes the synchronization offset, and $D_1$ denotes the maximum delay of the propagation channel of the candidate eNB1.

The equivalent channel delay of the cooperative eNB m is expressed as equation (5).

$$D_{m,equ} = \Delta D_m + D_m, \ m = 0 \ldots M \quad (5)$$

The equivalent maximum delay of M cooperative candidate eNBs can be designed as equation (6).

$$D_{equ} = \max_{m=0 \ldots M} (D_{m,equ}) \quad (6)$$

Case 1: Timing Measurement Report Message

In a preferred embodiment of the present invention, the UE reports the entire time difference information to the eNB. The message, i.e. eNB_DELAY_INDICATION message, is formatted as shown in tables 10 and 11.

TABLE 10

Exemplary eNB_DELAY_INDICATION
message format for IEEE 802 system

| Syntax | Length | Notes |
|---|---|---|
| eNB_DELAY_INDICATION ( ) { | | |
| Message ID | 8 bits | Indicate message type |
| eNB ID | 16 bits | eNB ID with which signal is detected |
| Candidate CoMP set delay indication} | 8 bits | maximum delay spread of propagation channel from eNB |

TABLE 11

Exemplary eNB_DELAY_INDICATION message specified
in feedback format of 3GPP system

| 9-bit cell ID | 8-bit delay indication | Other fields |
|---|---|---|

Case 2: Time-Measurement-Based Binary Report Format

In a preferred embodiment of the present invention, the equivalent delay information can be transmitted without CoMP transmission candidate set. If interference from any of the neighbor cells is detected, the UE reports such information. The report, i.e. BINARY_DELAY_INDICATION message, is formatted as shown in tables 12 and 13.

TABLE 12

Exemplary BINARY_DELAY_INDICATION
message format for IEEE 802 system

| Syntax | Length | Notes |
|---|---|---|
| BINARY_DELAY_INDICATION ( ) { | | |
| Message ID | 8 bits | Indicate message type |
| eNB ID | 16 bits | eNB ID with which signal is detected |
| Delay | 1 bit | Indicate whether equivalent delayer is greater than a predetermined threshold value |
| Reserved | variable | |
| } | | |

TABLE 13

Exemplary BINARY_DELAY_INDICATION message
specified in feedback format of 3GPP system

| 9-bit cell ID | 1-bit delay indication | Other fields |
|---|---|---|

The above-described DELAY_ INDICATION message can be combined with conventional RSSI report message for generating enhanced RSSI report message.

In another preferred embodiment, the UE measures $\Box D_m$ and $D_m$ of other eNB, preferably one of the list of cop transmission set and generates a vector as shown in equation (7).

$$u(m) = \begin{cases} 1, & D_{m,equ} DT_{CP} + T_{th} \\ 0, & D_{m,equ} > T_{CP} + T_{th} \end{cases}, m = 1 \ldots M \quad (7)$$

Here, $T_{CP}$ denotes the CP length of the system, and $T_{th}$ denotes a predetermined threshold value that is not appropriate for CoMP processing operation.

The UE can feed back UE_CANDIDATE_COMP_SET_DELAY message to BS in the exemplary format as shown in table 14 or 15.

TABLE 14

Exemplary UE_CANDIDATE_COMP_SET_DELAY
message format for IEEE 802 system

| Syntax | Length | Notes |
|---|---|---|
| UE_CANDIDATE_COMP_SET_DELAY ( ) { | | |
| Message ID | 8 bits | Indicate message type |
| Candidate CoMP set delay indication | M bits | $m^{th}$ bit indicates whether the extra delay from $m^{th}$ eNB listed in CoMP candidate set is equal to or less than predetermined threshold value.<br>1: delay equal to or less than threshold value<br>0: delay greater than threshold value |
| Reserved | variable | |
| } | | |

TABLE 15

Exemplary UE_CANDIDATE_COMP_SET_DELAY message
specified in feedback format of 3GPP system

| 1 bit delay indication for candidate CoMP eNB1 | 1 bit delay indication for candidate CoMP eNB2 | 1 bit delay indication for candidate CoMP eNB3 | 1 bit delay indication for candidate CoMP eNB4 | Other fields |
|---|---|---|---|---|

If the delay report is received according to the defined format, the eNB combines the information on the algorithm for CoMP transmission scheduling.

Case 3: Leakage Energy-Based Report Format

The maximum delay profile is not the only factor causing performance degradation derived from inter-symbol interference. In case that the CP length is not guaranteed, the energy amount leaked at the next OFDM symbol is important too.

Figure 5:
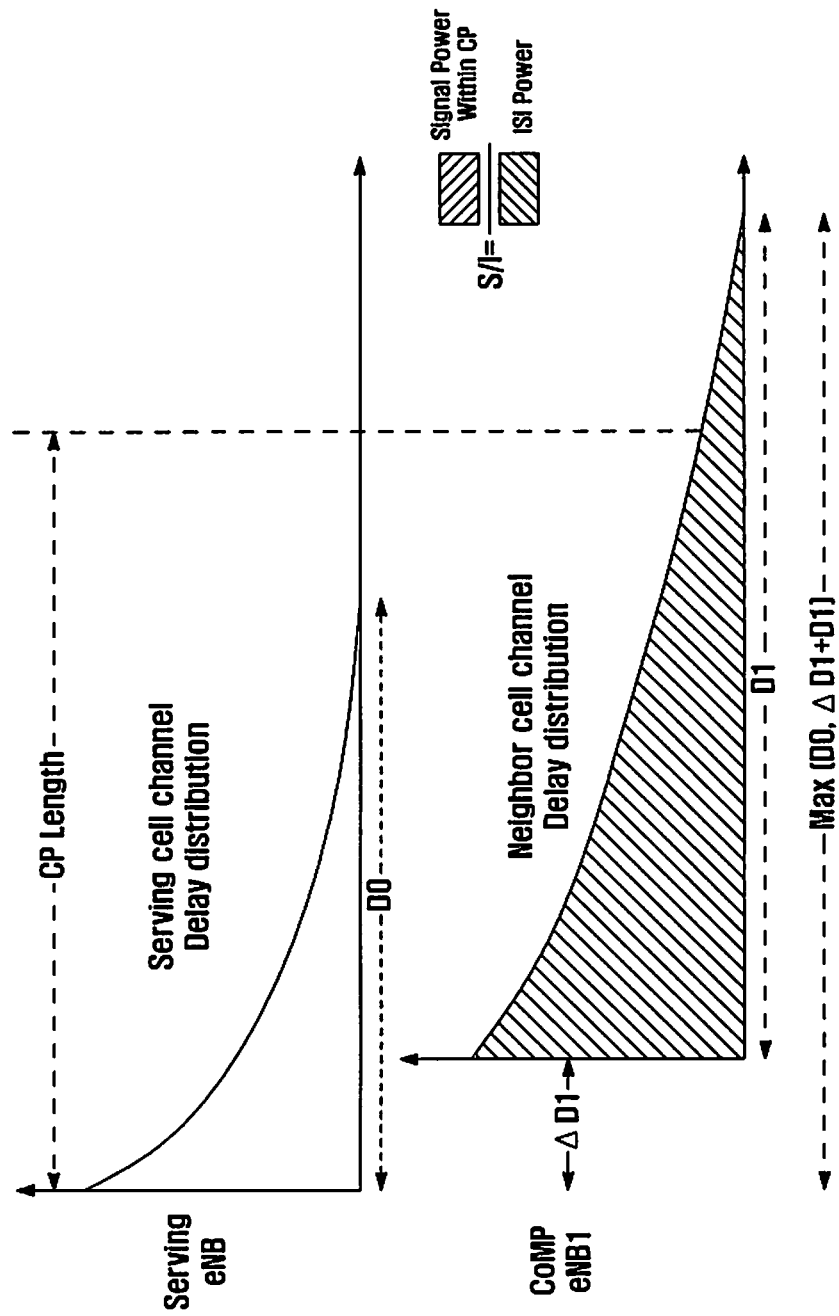
FIG. 5 is a diagram illustrating exemplary calculation of induced intra-symbol interference leakage amount.

FIG. 5 is a diagram illustrating exemplary calculation of induced intra-symbol interference leakage amount. Preferentially, the UE calculates delay profile of the CoMP transmission candidate channel and the valid signal energy in the cyclic prefix as well as the leakage energy with the exception of CP. Accordingly, it is possible to calculate Signal to Interference ratio (S/I).

In a preferred embodiment, the UE can transmit Signal to Interference ratio to the serving eNB for CoMP processing reference.

In another preferred embodiment, transmitted is a binary indicator indicating whether the Signal to Interference ratio is equal to or less than a predetermined threshold value.

Combined/Adaptive Comp Processing Selection/Recommendation Feedback Format

Until now, two types of feedback information are described. One is the RSSI measurement-based feedback information, and the other is the time delay measurement-based feedback information. The two types of messages can be combined in other embodiments.

For example, a binary UE_CANDIDATE_COMP_SET_DELAY message can be further combined to the RSSI-based message for reducing overhead. For example, the combined message of tables 3 and 14, i.e. COMBINED_COMP_SET_SELECTION message, is formatted as shown in table 16.

TABLE 16

Exemplary COMBINED_COMP_SET_SELECTION
message format for IEEE 802 system

| Syntax | Length | Notes |
|---|---|---|
| COMBINED_COMP_SET_SELECTION ( ) { | | |
| Message ID | 8 bits | Indicate message type |
| UE CoMP set selection indication | M (or M + 1) bits | $m^{th}$ bit indicates whether the $m^{th}$ eNB listed in CoMP candidate set is preferable for CoMP processing operation.<br>1: u(m) = v(m) = 1<br>0: otherwise (If cell selection is possible another bit is added to indicate whether the serving eNB has to join the cop processing, and total length is M + 1 bits) |
| Reserved | variable | |
| } | | |

There can be other preferred embodiments for transmitting the messages defined to have various information amounts adaptively. For example, the UE transmits an unified message having a message type indication field of two or three bits which indicate the content of the message body and indicates the unified CoMP processing feedback message, i.e. RSSI-based binary CoMP processing selection or quantized RSSI report. The unified message contributes to the simplification of the system design and adaptive determination of CoMP processing information. This means the necessity of the information type which can be used along with other new CoMP processing information request message transmitted from the eNB to the UE.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A feedback method of a terminal for supporting coordinated multipoint processing in a mobile communication system, the method comprising:
    generating a measurement report message including delay information of a first signal received from a candidate transmission point and power allocation information for the candidate transmission point determined based on information on a received signal power corresponding to the first signal;
    transmitting the measurement report message to a serving transmission point; and
    receiving a second signal transmitted by a cooperative transmission point selected among the serving transmission point and the candidate transmission point, based on the measurement report message,
    wherein the delay information comprises information on whether a delay per the received first signal from the candidate transmission point is greater than a threshold value,
    wherein the threshold value is determined based on a cyclic prefix of the serving transmission point,
    wherein the delay corresponding to the selected cooperative transmission point is less than the threshold value,
    wherein the power allocation information is quantized based on information on a received signal power corresponding to the serving transmission point, and
    wherein a boosting value of the quantized power allocation information is determined based on a transmission power of the serving transmission point.

2. The feedback method of claim 1, wherein the measurement report message comprises signal strength information per signal received from at least one of the serving transmission point and the candidate transmission point.

3. The feedback method of claim 1, wherein the delay information comprises the reception timing per received signal from the candidate transmission point.

4. A feedback method of a terminal for supporting coordinated multipoint processing in a mobile communication system, the method comprising:
    generating a measurement report message including measurement of a channel quality of a serving transmission point and a candidate transmission point adjacent to the serving transmission point, wherein the channel quality comprises signal strength information per signal received from the serving transmission point and the candidate transmission point, and generating the measurement report message comprises:
        creating the measurement report message by determining power allocation information to be recommended to the serving transmission point and the candidate transmission point according to received signal strengths, wherein the power allocation information is quantized based on the signal strength information per signal received from the serving transmission point;
    transmitting the measurement report message to the serving transmission point; and
    receiving a signal transmitted by a cooperative transmission point selected among the serving transmission point and the candidate transmission point, based on the measurement report message,
    wherein a boosting value of the quantized power allocation information is determined based on a transmission power of the serving transmission point.

5. The feedback method of claim 4, wherein generating the measurement report message comprises creating the measurement report message by processing the channel quality in binary format or quantizing the channel quality.

6. The feedback method of claim 4, wherein generating the measurement report message comprises creating the measurement report message having precoding matrix indicators for the serving transmission point and the candidate transmission point.

7. The feedback method of claim 4, further comprising checking the candidate transmission point from a candidate transmission point list transmitted by the serving transmission point.

8. A cooperation method of a transmission point for cooperative multipoint processing in a mobile communication system, the method comprising:
    receiving a measurement report message from a terminal, the measurement report message including delay information of a first signal received by a terminal from a candidate transmission point and power allocation information for the candidate transmission point determined based on information on a received signal power corresponding to the first signal;
    determining a cooperative transmission point among a serving transmission point and the candidate transmission point, based on the measurement report message;
    transmitting a second signal to the terminal in cooperation with the cooperative transmission point;
    wherein the delay information comprises information on whether a delay per the received first signal by the terminal, from the candidate transmission point, is greater than a threshold value, and
    wherein the threshold value is determined based on a cyclic prefix of the serving transmission point,
    wherein the delay corresponding to the selected cooperative transmission point is less than the threshold value,
    wherein the power allocation information is quantized based on information on a received signal power corresponding to the serving transmission point, and
    wherein a boosting value of the quantized power allocation information is determined based on a transmission power of the serving transmission point.

9. The cooperation method of claim 8, wherein the measurement report message comprises signal strength information per signal received from at least one of the serving transmission point and the candidate transmission point.

10. The cooperation method of claim 8, wherein the delay information comprises the reception timing per received signal from the candidate transmission point.

11. A cooperation method of a transmission point for cooperative multipoint processing in a mobile communication system, the method comprising:
    determining a cooperative transmission point by analyzing channel quality of a candidate transmission point that is included in a measurement report message transmitted by a terminal, wherein the channel quality comprises signal strength information per signal received from a serving transmission point and the candidate transmission point and the terminal generates the measurement report message by determining power allocation information to be recommended to the serving transmission point and the candidate transmission point according to received signal strengths, and wherein the power allocation information is quantized based on the signal strength information per signal received from the serving transmission point; and
    transmitting data to the terminal in cooperation with the cooperative transmission point, wherein a boosting value of the quantized power allocation information is determined based on a transmission power of the serving transmission point.

12. The cooperation method of claim 11, wherein the terminal generates the measurement report message by processing the channel quality in binary format or quantizing the channel quality.

13. The cooperation method of claim 11, further comprising transmitting a list including the candidate transmission point for the terminal to measure the channel quality.

* * * * *